United States Patent
Frost

[19]

[11] Patent Number: 6,164,656
[45] Date of Patent: Dec. 26, 2000

[54] TURBINE NOZZLE INTERFACE SEAL AND METHODS

[75] Inventor: Wilson Frost, North Muskegon, Mich.

[73] Assignee: General Electric Company, Cincinnati, Ohio

[21] Appl. No.: 09/239,637

[22] Filed: Jan. 29, 1999

[51] Int. Cl.[7] ............................................ F16J 15/02
[52] U.S. Cl. .................. 277/312; 277/630; 277/641; 415/135; 415/173.3; 415/173.6
[58] Field of Search ................................ 277/643, 642, 277/641, 649, 630, 312, 647; 415/135, 136, 173.1, 173.3, 173.6, 174.2

[56] References Cited

U.S. PATENT DOCUMENTS

| | | | |
|---|---|---|---|
| 2,396,319 | 3/1946 | Edwards et al. | 277/643 |
| 4,063,845 | 12/1977 | Allen | 277/643 |
| 4,177,004 | 12/1979 | Riedmiller et al. | 415/136 |
| 4,199,151 | 4/1980 | Bartos | 277/236 |
| 4,602,795 | 7/1986 | Lillibridge | 277/644 |
| 4,752,184 | 6/1988 | Liang | 415/116 |
| 4,759,555 | 7/1988 | Halling | 277/200 |
| 4,863,343 | 9/1989 | Smed | 415/138 |
| 5,149,250 | 9/1992 | Plemmons et al. | 415/209.3 |
| 5,188,506 | 2/1993 | Creevy et al. | 415/173.1 |
| 5,249,920 | 10/1993 | Shepherd et al. | 415/134 |
| 5,273,396 | 12/1993 | Albrecht et al. | 415/173.6 |
| 5,372,476 | 12/1994 | Hemmelgarn et al. | 415/135 |
| 5,797,723 | 8/1998 | Frost et al. | 415/174.2 |
| 5,865,600 | 2/1999 | Mori et al. | 277/643 |

*Primary Examiner*—Anthony Knight
*Assistant Examiner*—Vishal Patel
*Attorney, Agent, or Firm*—Andrew C. Hess; Nathan D. Herkamp

[57] ABSTRACT

An interface seal for a turbine engine including a rotor shroud hanger including at least one opening, an outer band including an aft rail, and a seal spring mounted in the opening and extending over an interface between the outer band and the shroud hanger, is described. The seal provides a barrier that prevents the leakage of high pressure cooling air through the interface into the combustion gas flowpath bypassing turbine engine components, and thus forces the high pressure cooling air through the necessary turbine engine components.

20 Claims, 6 Drawing Sheets

TURBINE NOZZLE INTERFACE SEAL AND METHODS

BACKGROUND OF THE INVENTION

This invention relates generally to turbine engines and, more particularly, to turbine interface seals.

Gas turbine engines typically include a multistage axial flow low pressure compressor and a multistage axial flow high pressure compressor which supplies high pressure air to a combustor. The compressors include stages of stationary components referred to as stators and stages of rotational components, which add work to the system, referred to as rotors.

A portion of compressed high pressure air supplied to the combustor is mixed with fuel, ignited, and utilized to generate hot combustion gases which flow further downstream to one of the multistage flowpaths. Particularly, the combustion gases flow through one or more turbine stages which extract energy from the hot gases to power the rotors in the compressors and provide other useful work.

One turbine stage downstream from the combustor is commonly referred to as a turbine nozzle stage and includes a plurality of circumferentially spaced vanes that extend in a radial direction with respect to a central axis of the turbine engine. The vanes extend between an outer band and an inner band that assist in maintaining axial and radial positioning of the vanes and define a flowpath for the combustion gases.

Downstream from the nozzle stage is another rotor stage that includes a plurality of circumferentially spaced rotor blades that extend radially outward from a rotor disk and are surrounded by an annular shroud which also defines a flowpath for the combustion gases. Adjacent ends of the turbine nozzle outer band and rotor shroud are spaced apart by a gap to facilitate assembly as well as to accommodate differential thermal expansion and contraction that occurs during operation of the engine. The gap, however, also is a potential leakage path for compressed air.

Particularly, a portion of the compressed air may be extracted from the high pressure compressor for turbine section cooling, airframe pressurization, anti-icing, and other uses. For example, for turbine section cooling, a portion of the extracted air is channeled through the nozzle vanes. The extracted air is at a higher pressure than the combustion gases and is channeled to a cavity formed by a portion of a stator casing, an inside face of the outer band, and a portion of a rotor shroud hanger. The extracted air naturally seeks to move from the cavity to the combustion gas flowpath formed by an outside face of the outer band and the rotor shroud. Therefore, the gap between the outer band and shroud must be properly sealed, otherwise the high pressure extracted air would leak through the gap, or an interface, to the lower pressure flowpath.

It is known to use a "w" seal or a leaf seal to seal the interfaces in turbine engines. For example, in a typical turbine, outer bands extend substantially parallel to a central axis of the engine and include an axially spaced apart forward rail and aft rail. The rails extend radially outward from the outer bands with the aft rail of the nozzle outer band adjoining an adjacent rotor shroud or rotor shroud hanger. Typically, the leaf seals are assembled and mounted to the aft rails with mounting pins. The mounting pins extend through an inside face of the aft rails.

Sealing the interfaces in turbine engines and, in particular, a turbine nozzle is difficult due to the location of the nozzle, the increases and decreases in the temperature of the turbine engine components, and the resultant increases in the temperature and degradation of the seals. It would be desirable to provide a turbine engine interface seal that is easy to install and can withstand high temperatures for long periods of time and retain the necessary sealing characteristics.

BRIEF SUMMARY OF THE INVENTION

These and other objects may be attained by a turbine engine interface seal formed by a rotor shroud hanger, an outer band including an aft rail, and a seal spring extending over an interface between the hanger and the outer band. More specifically, the seal spring forms a contact point with the aft rail of the outer band that prevents the leakage of extracted high pressure cooling air through the interface into a combustion gas flowpath. The seal spring is located in at least one opening in the hanger and in operation, is in direct contact with the high pressure cooling air. The high pressure cooling air maintains the seal spring at a cool temperature, which extends the useful life of the seal spring.

The above described interface seal withstands high temperatures for long periods of time and retains the necessary sealing characteristics.

DETAILED DESCRIPTION OF THE INVENTION

Figure 1:
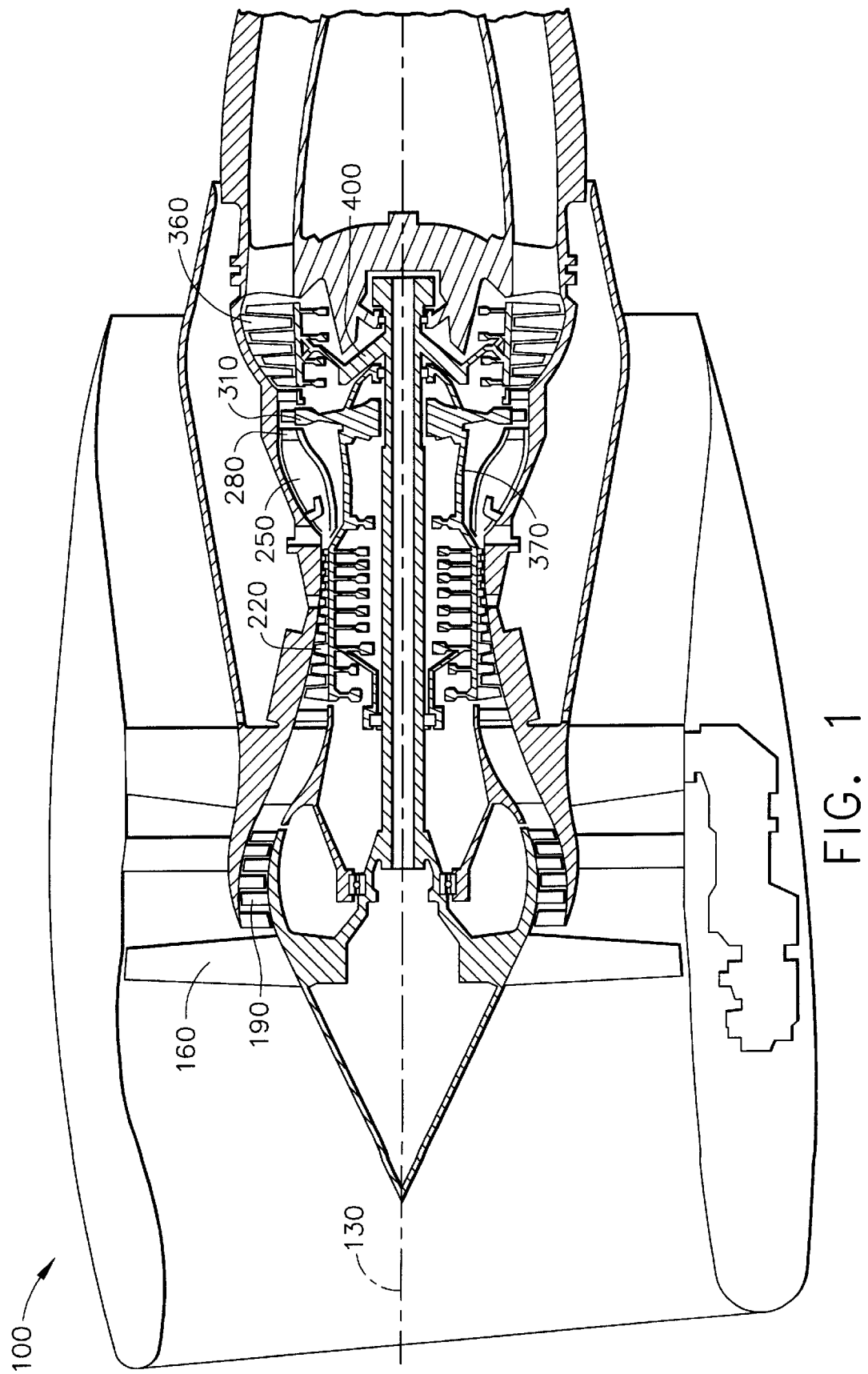
FIG. 1 is a cross sectional view of a turbine engine along the longitudinal central axis.

FIG. 1 is a cross sectional view of a turbine engine 100 which is symmetrical about a central axis 130. Engine 100 includes in serial flow communication a front fan 160, a multistage low pressure compressor 190 and a multistage high pressure compressor 220 which supplies high pressure air to a combustor 250.

A high pressure turbine nozzle stage 280 is downstream from combustor 250 and immediately precedes a high pressure turbine rotor stage 310 and a multistage low pressure turbine rotor stage 360. High pressure turbine rotor stage 310 is connected to high pressure compressor 220 by a first shaft 370, and multistage low pressure turbine rotor stage 360 is connected to fan 160 by a second coaxial shaft 400.

During operation, air flows downstream through fan 160 and into multistage low pressure compressor 190. The air is compressed and continues to flow downstream through multistage high pressure compressor 220 where the air becomes highly pressurized. A portion of the high pressure compressed air is directed to combustor 250, mixed with fuel, and ignited to generate hot combustion gases which flow downstream through turbine nozzle stage 280. The combustion gases flow into high pressure turbine rotor stage 310 and low pressure turbine rotor stage 360 where some of the energy from these combustion gases are extracted and utilized for powering high pressure compressor 220 and fan 160, respectively.

Figure 2:
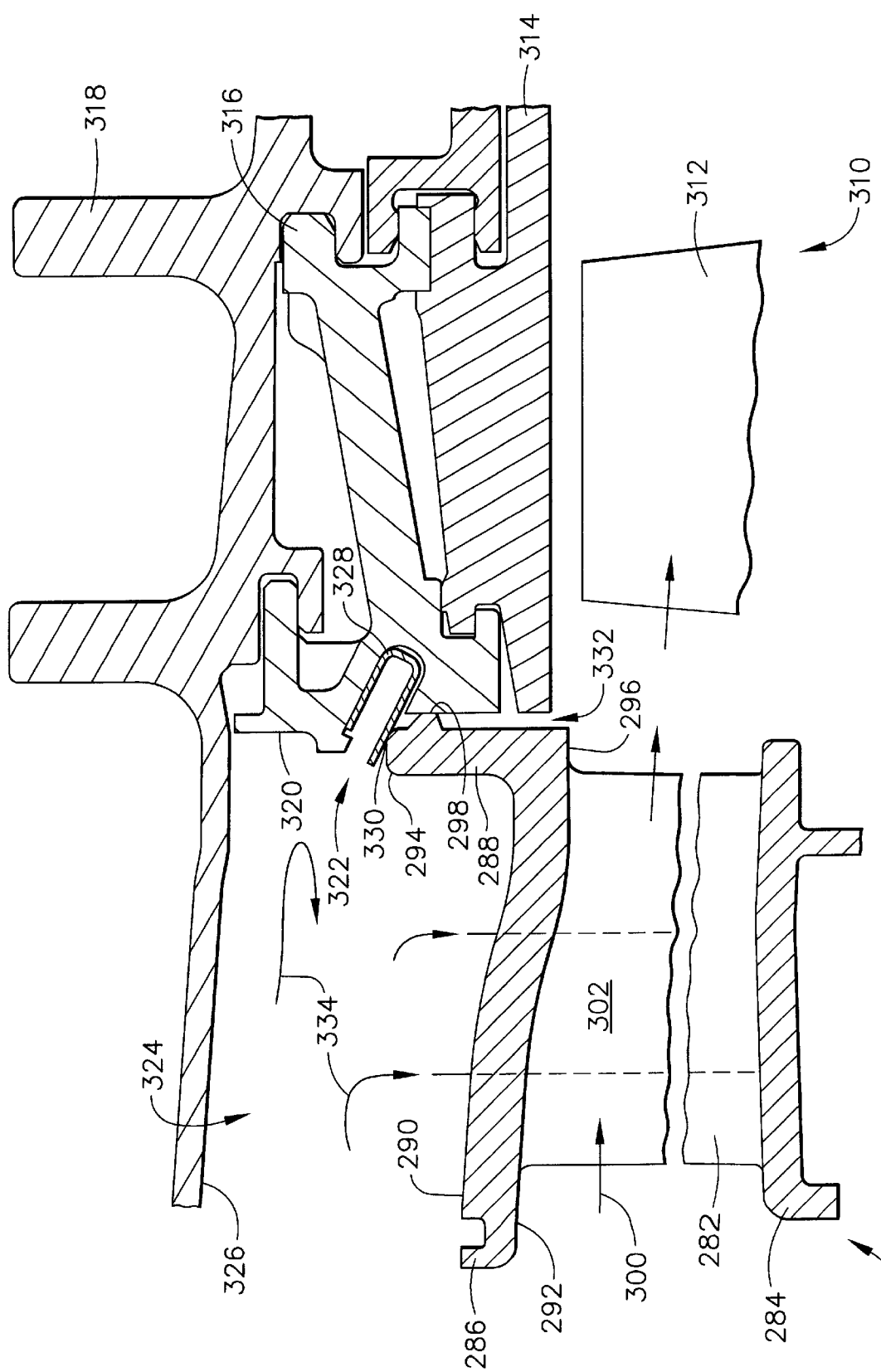
FIG. 2 is an enlarged axial sectional view of a portion of the turbine engine shown in FIG. 1.

FIG. 2 illustrates a portion of the engine shown in FIG. 1. As shown in FIG. 2, nozzle stage 280 includes a nozzle vane 282 connected to an inner band 284 and an outer band 286. Outer band 286 includes a forward rail (not shown), an aft rail 288, an inside face 290, and an outside face 292. Aft rail 288 includes a first end 294, a second end 296, and a pad 298 located between first end 294 and second end 296.

Combustion gases 300 flow downstream from combustor 250 (shown in FIG. 1) and directly through nozzle stage 280. A combustion gas flowpath 302 is defined by inner band 284 and outer band 286. Combustion gases 300 flow through flowpath 302 past nozzle vane 282 and into rotor stage 310.

Rotor stage 310 includes a rotor blade 312 connected to a rotor disk (shown in FIG. 1) and surrounded by a rotor shroud 314. In one embodiment, rotor shroud 314 extends 360 degrees around central axis 130 of turbine engine 100 (shown in FIG. 1) and is connected to a rotor shroud hanger 316. Rotor shroud hanger 316 is supported by and connected to a portion of stator casing 318.

In one embodiment, hanger 316 includes a first side 320 and at least one opening 322 that extends 360 degrees around central axis 130 of turbine engine 100. Opening 322 is slot shaped. A cavity 324 is formed by an inside face 326 of stator casing 318, inside face 290 of outer band 286, and first side 320 of hanger 316.

A seal spring 328 is located in slot 322 and forms a contact point 330 with first end 294 of aft rail 288. In one embodiment, seal spring 328 extends substantially 360 degrees around central axis 130 of turbine engine 100 and may include a bridging piece (shown in FIG. 6). An interface 332 is formed between outside face 292 of aft rail 288 and first side 320 of hanger 316. Spring seal 328 may, for example, be fabricated from material containing on average, 19% Chromium, 11% Cobalt, 10% Molybdemum, 3% Titanium, 52% Nickel, and a maximum of 5% Iron.

In operation, high pressure cooling air 334 is extracted from high pressure compressor 220 (shown in FIG. 1) and directed to cavity 324. High pressure cooling air 334 circulates within cavity 324 and moves through outer band 286 and nozzle vane 282. Cooling air 334 cools vane 282 then mixes with combustion gases 300 and moves further downstream through rotor stage 310.

Cooling air 334 also circulates into slot 322 and cools seal spring 328. Cooling air 334 causes seal spring 328 to expand and increases resistance at point 330. The location and expansion of seal spring 328 and the additional pressure at point 330 on aft rail 288 prevents cooling air 334 from leaking through interface 332 and bypassing nozzle stage 280 and vane 282.

Figure 3:
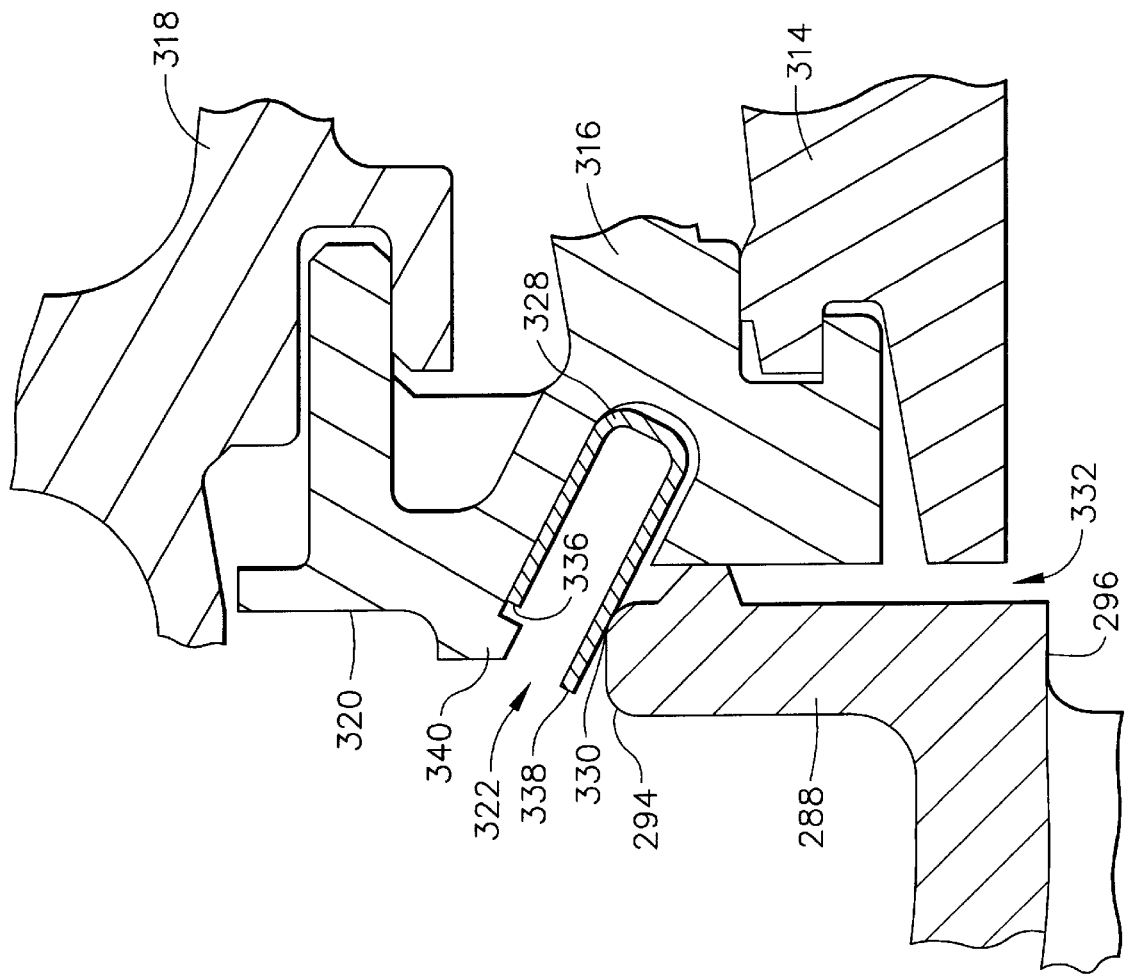
FIG. 3 is an enlarged axial sectional view of the interface seal illustrated in FIG. 2.

FIG. 3 illustrates a portion of the engine shown in FIG. 1. As shown in FIG. 3, outer band 286 (shown in FIG. 2) and rotor shroud 314 represent a first segment 286 and a second segment 314, respectively of interface 332. Seal spring 328 has a first end 336 and a second end 338. Seal spring 328 is mounted within slot 322 formed in hanger 316. First end 336 of seal spring 328 is adjacent a locking shoulder 340 formed in hanger 316 at first end 320. Second end 338 of seal spring 328 forms contact point 330 with first end 294 of aft rail 288.

In operation, locking shoulder 340 prevents seal spring 328 from moving out of slot 322 when high pressure cooling-air 334 (shown in FIG. 2) causes seal spring 328 to expand. Combustion gases 300 (shown in FIG. 2) flow through flowpath 302 and create an area of low pressure conducive for leakage of high pressure cooling air 334 through interface 332. Seal spring 328 prevents cooling air 334 from escaping through interface 332 and bypassing nozzle stage 280 and vane 282 (shown in FIG. 2).

Figure 4:
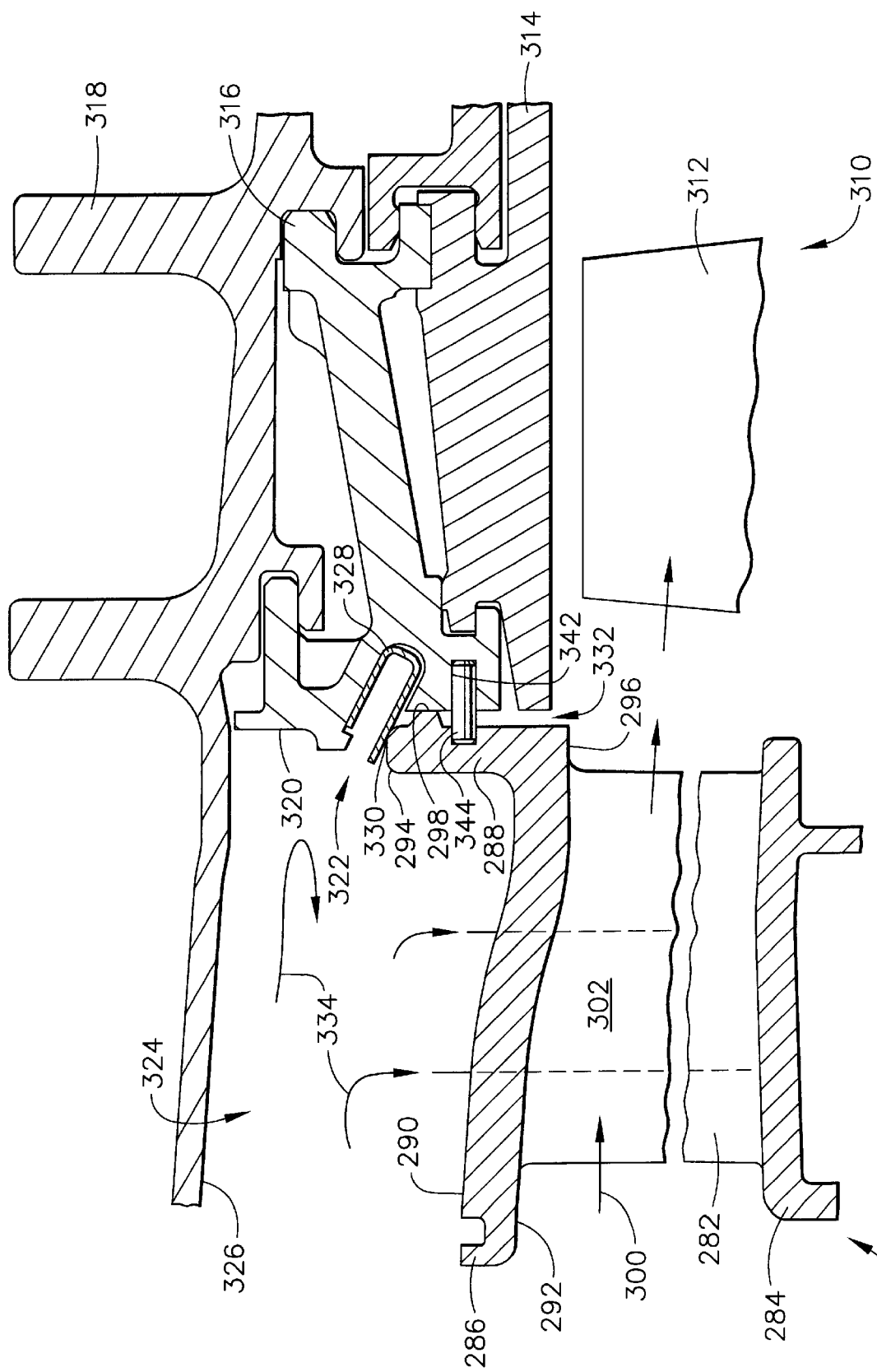
FIG. 4 is an enlarged axial sectional view of a portion of the turbine engine shown in FIG. 2.
Figure 5:
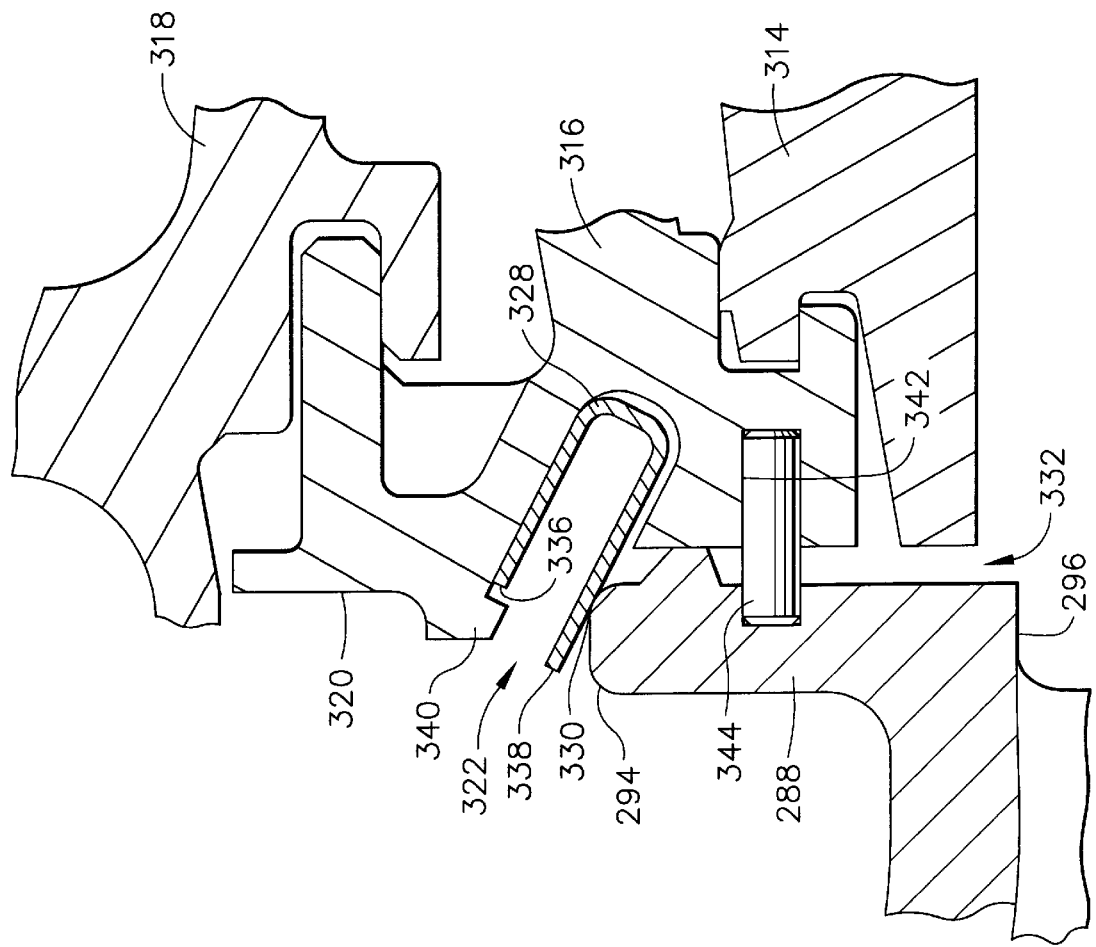
FIG. 5 is an enlarged axial sectional view of the interface seal illustrated in FIG. 4.

FIGS. 4 and 5 illustrate a portion of the engine shown in FIG. 1 in accordance with another embodiment of the present invention. As shown in FIGS. 4 and 5, hanger 316 includes a plurality of slot shaped openings 322 and 342. A pin 344 is fixedly attached to aft rail 288 between second end 296 and pad 298. Pin 344 is inserted into first slot 342 in hanger 316. A plurality of pins 344 may be utilized.

In operation, pin 344 provides a further barrier, along with seal spring 332, for preventing cooling air 334 from leaking through interface 332 directly into flowpath 302 and bypassing nozzle stage 280 and vane 282. Pin 344 also provides further radial stabilization of nozzle stage 280 given the expansions and contractions that may occur during operation of engine 100 (shown in FIG. 1).

The location and configuration of seal spring 328 provides a sealing of interface 332 that can withstand high temperatures for long periods of time and the retention of the necessary sealing characteristics. In addition, pin 344 assists in the prevention of the radial displacement of outer band 286.

Figure 6:
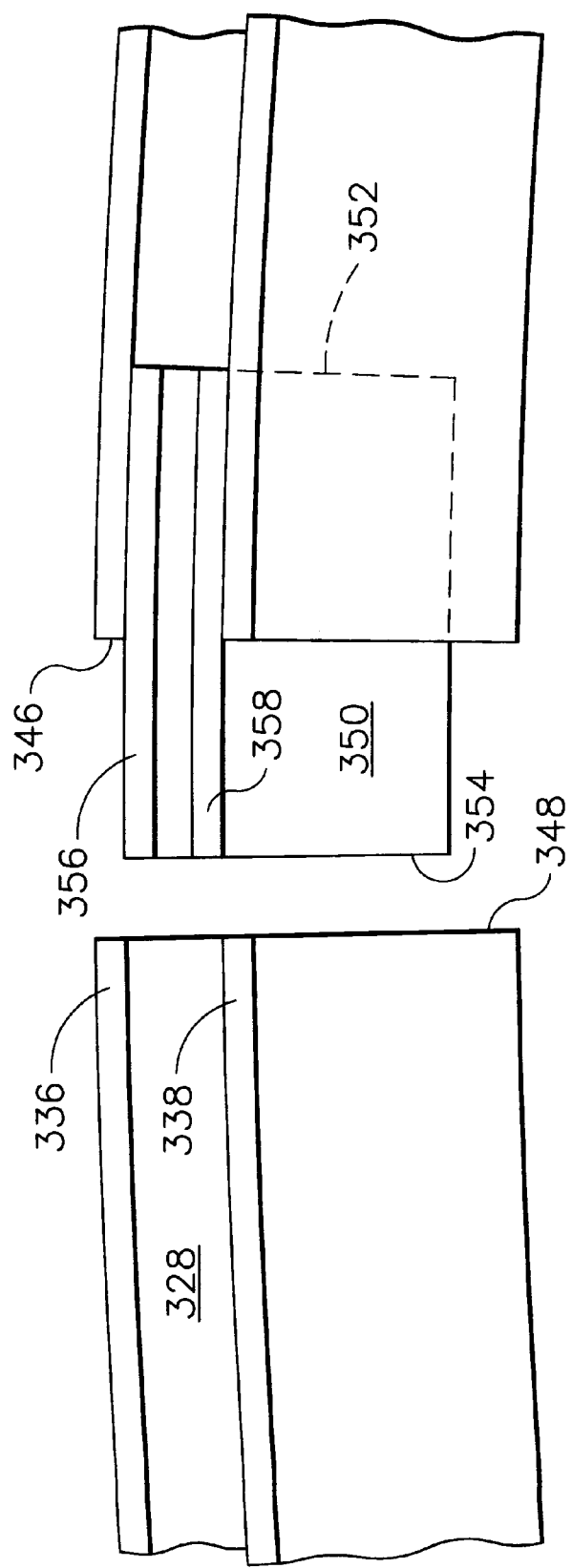
FIG. 6 is a view of the seal spring shown in FIG. 2.

FIG. 6 illustrates a portion of seal spring 328. As explained above, seal spring 328 extends radially substantially 360 degrees, and has a third end 346, a fourth end 348, and a bridging piece 350 inserted into third end 346. Bridging piece 350 has a smaller diameter than ends 346 and 348, and has a first end 352, a second end 354, a third end 356, and a fourth end 358.

Bridging piece 350 is inserted into an opening in third end 346 of seal spring 328. Seal spring 328 along with bridging piece 350 are inserted in slot 322. Once seal spring 328 is fully inserted into slot 322, second end 354 of bridging piece 350 is inserted into fourth end 348 of seal spring 328. Seal spring 328 and bridging piece 350 are fabricated from the same material, and expand and contract at the same rates. Seal spring 328 and bridging piece 350 prevent high pressure cooling air 334 (shown in FIG. 2) from leaking through interface 332 during periods of expansion and contraction.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A seal assembly for a turbine engine having a central axis, said seal assembly comprising:

a cavity;

an outer band comprising an inside face, an outside face, and an aft rail, said outer band inside face defining a portion of said cavity;

a pin extending from said aft rail;

a hanger comprising a first opening and a second opening, said pin inserted into said first opening; and a seal spring comprising a first end and a second end, said seal spring at least partially located in said second opening in said hanger, said spring second end extending into said cavity over an interface between said hanger and said outer band.

2. A seal assembly in accordance with claim 1 wherein said aft rail further comprises a first end, a second end, and a pad located between said first end and said second end of said aft rail.

3. A seal assembly in accordance with claim 2 wherein said hanger further comprises a locking shoulder adjacent said second opening.

4. A seal assembly in accordance with claim 3 wherein said first end of said seal spring is adjacent said locking shoulder.

5. A seal assembly in accordance with claim 2 wherein said hanger extends 360 degrees around the central axis.

6. A seal assembly in accordance with claim 5 wherein said second opening extends substantially 360 degrees around the central axis.

7. A seal assembly in accordance with claim 6 wherein said seal spring extends substantially 360 degrees around the central axis.

8. A seal assembly in accordance with claim 5 wherein said first opening extends substantially 360 degrees around the central axis.

9. A seal assembly in accordance with claim 8 wherein said pin comprises a plurality of pins extending substantially 360 degrees around the central axis.

10. A seal comprising:
   a first segment comprising an inside face, an outside face, and an aft rail extending radially outward, said rail having a first end and a second end;
   a second segment connected to said first segment, said second segment comprising a first side comprising at least one opening; and
   a seal spring having a first end and a second end, said sprig mounted in said at least one opening in said second segment, and said second end of said spring extending between said second segment and said first segment and providing a contact point on said first segment, said first segment further comprising a projection extending outwardly from said first segment aft rail between said seal spring and said first segment outside face.

11. A seal in accordance with claim 10 wherein said at least one opening further comprises a first slot and a second slot, wherein said first slot extends axially inward and is located between said first end and said second end, and said second slot extends substantially axially and radially inward and is located between said first end and said first slot.

12. A seal in accordance with claim 11 wherein said first segment further comprises a pin fixedly attached and extending from said aft rail, said pin located between said first end and said second end, and wherein said pin slidingly engages said first slot.

13. A seal in accordance with claim 12 wherein said first segment projection comprises a pad extending axially outward from said aft rail and located between said first end and said pin.

14. A seal in accordance with claim 11 wherein said first side of said second segment further comprises a shoulder extending substantially axially outward and adjacent said second slot.

15. A seal in accordance with claim 14 wherein said second slot comprises said seal spring and said first end of said spring extends to said shoulder.

16. A seal in accordance with claim 11 wherein said second segment extends radially 360 degrees, and wherein said first slot and said second slot extend radially substantially 360 degrees.

17. A seal in accordance with claim 12 wherein said pin comprises a plurality of pins extending radially substantially 360 degrees.

18. A seal in accordance with claim 16 wherein said seal spring extends radially substantially 360 degrees and further comprises a bridging piece.

19. A method for sealing an interface between high pressure cooling air and combustion gases in a turbine nozzle, the interface including a high pressure nozzle including an outer band and an inner band, and a blade row including a rotor shroud attached to a hanger, the outer band further including an inside face, an outside face, and an aft rail having a first end, a second end, and a pad located between the first end and the second end, the hanger extends radially 360 degrees and includes a first slot and a second slot extending radially 360 degrees, the second slot includes a shoulder, said method comprising the steps of:
   attaching at least one pin to the aft rail of the outer band;
   inserting a seal spring into the second slot, wherein the first end of the seal spring is adjacent the shoulder; and
   connecting the outer band to the hanger such that the outer band pad contacts the hanger between the hanger first and second slots.

20. A method for sealing an interface in accordance with claim 19 wherein said step of connecting the outer band to the hanger further comprises the steps of:
   inserting at least one pin attached to the outer band into the first slot of the hanger; and
   sliding the outer band until the pin reaches the bottom of the first slot and the outer band makes contact with the seal spring.

* * * * *